United States Patent
Furuta et al.

(10) Patent No.: US 7,457,301 B2
(45) Date of Patent: Nov. 25, 2008

(54) VEHICULAR COMMUNICATIONS SYSTEM

(75) Inventors: Katsuhiko Furuta, Chita-gun (JP); Tomohisa Kishigami, Obu (JP); Keiichi Yoshino, Kariya (JP); Mitsutoshi Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 630 days.

(21) Appl. No.: 11/151,441

(22) Filed: Jun. 14, 2005

(65) Prior Publication Data
US 2006/0013237 A1 Jan. 19, 2006

(30) Foreign Application Priority Data
Jun. 22, 2004 (JP) .............................. 2004-184054
May 13, 2005 (JP) .............................. 2005-141550

(51) Int. Cl.
*H04L 12/28* (2006.01)
(52) U.S. Cl. ....................................... 370/401; 713/300
(58) Field of Classification Search ........................ None
See application file for complete search history.

(56) References Cited

U.S. PATENT DOCUMENTS

| 6,385,166 | B1 | 5/2002 | Takagi et al. |
| 6,484,082 | B1 | 11/2002 | Millsap et al. |
| 7,117,379 | B2 * | 10/2006 | Hamilton ................... 713/320 |
| 2002/0006139 | A1 | 1/2002 | Kikkawa et al. |
| 2002/0018479 | A1 | 2/2002 | Kikkawa et al. |
| 2003/0223436 | A1 | 12/2003 | Lohrmann et al. |
| 2004/0107371 | A1 * | 6/2004 | Kimura et al. ............... 713/300 |

FOREIGN PATENT DOCUMENTS

| JP | A-2004-64626 | 2/2004 |
| JP | A-2004-349961 | 12/2004 |

OTHER PUBLICATIONS

Search Report from French Patent Office issued on Dec. 12, 2006 for the corresponding French patent application No. FR 0506338.
Minuth et al. "Network Management: Concept and Application Programming Interface Version 2.5.1 Passage." *OSEK/VDX* (May 31, 2000): pp. 1-136.

* cited by examiner

*Primary Examiner*—Chau Nguyen
*Assistant Examiner*—Eunsook Choi
(74) *Attorney, Agent, or Firm*—Posz Law Group, PLC

(57) ABSTRACT

In a case that a gateway unit connected with multiple networks receives mode managing data indicating an operating mode from a first network, the gateway unit sends mode managing data formed based on the received mode managing data only to control units and a gateway unit connected with a second network excluding the first network. This prevents both the gateways units from repeatedly exchanging mode managing data indicating a normal operating mode. Each control unit thereby rapidly transfers to a low power consumption mode when being able to operate in the low power consumption mode.

9 Claims, 4 Drawing Sheets

COMMUNICATIONS DATA FRAME

MODE MANAGING DATA FRAME

VEHICULAR COMMUNICATIONS SYSTEM

CROSS REFERENCE TO RELATED APPLICATIONS

This application is based on and incorporates herein by reference Japanese Patent Applications No. 2004-184054 filed on Jun. 22, 2004 and No. 2005-141550 filed on May 13, 2005.

FIELD OF THE INVENTION

The present invention relates to a vehicular communications system that exchange data between multiple control units mounted in a vehicle.

BACKGROUND OF THE INVENTION

Many control units are increasing that electronically control in-vehicle devices mounted in a vehicle. This leads to requirements of decentralized or cooperative control by sharing of data between the control units. For instance, the following is studied that control units are classified into groups such as a body group, a power-train group, or an information group, so each group of control units is networked as a network. The networked groups (or networks) are connected via gateway units that are capable of repeating data between the networks. The body group includes seats, doors, or the like. The power-train group includes an engine and an electronic throttle. The information group includes a navigation device, a VICS (Vehicle Information and Communication System), and an ETC (Electronic Toll Collection system).

In general, a control unit has a high power consumption mode and a low power consumption mode. When an ignition switch is turned off and a vehicle is being parked, a basic function as a vehicle is unnecessary. Therefore, the mode of the control unit is switched to the low power consumption mode. The low power consumption mode enables power consumption of each control unit to decrease, for instance, by the following operations: decreasing an operating frequency from that of a usual operating mode, continuing stopping until a given trigger signal is inputted, or the like.

Suppose that control units are grouped into a network. Here, when one control unit is in a high power consumption mode, the other control units are in concert set to the high power consumption mode for cooperative operations between the control units within the network. Further suppose that control units are grouped into multiple networks. Here, a gateway unit may manage operating modes for relevant control units within the multiple networks. In sum, suppose that certain control units that need to mutually exchange data are located in different relevant networks and the gateway unit receives information that one control unit within the certain control units is in the high power consumption mode. In this case, the gateway unit conducts a mode management for the relevant networks where the certain control units belong, to cause the relevant networks to work in the high power consumption mode. Here, the gateway unit usually manages an operating mode with respect to a network instead of individual control units in order to avoid complexity.

Such the gateway unit can collectively manages an operating mode for each of the networks when only one gateway unit is included in a communications system. Here, transferring between a low power consumption mode and a high power consumption mode can be thereby conducted smoothly.

The number of networked control units or the number of communicated data continues to increase, so a size of each network increases. In this case, only one gateway unit may not manage the large network. Data communications speeds between control units tend to limit the number of control units connected with one network. As the number of networks increases, it becomes difficult that only one gateway unit controls communications between the multiple networks. More than one gateway unit is supposed to be adopted in the communications system including the multiple networks.

In this case, a certain network connects with multiple networks via multiple gateway units, which has a potential of causing troubles in a mode management. When a gateway unit receives data of being in a high power consumption mode from one control unit, the gateway unit sends this data to all networks connected with the gateway unit. Thus, the gateway unit manages, in the high power consumption mode, the operating mode for all the networks connected. When multiple gateway units are included in this communications system, data of being in the high power consumption mode may be mutually exchanged between these multiple gateway units. Consequently, each control unit may be unable to change to a low power consumption mode.

SUMMARY OF THE INVENTION

It is an object of the present invention to provide a vehicular communications system to solve the above problem. The system enables each control unit to be able to change an operating mode between a high power consumption mode and a low power consumption mode even while including multiple gateway units for connecting multiple networks.

To achieve the above object, a vehicular communications system in a vehicle is provided with the following. A plurality of control units are included for being grouped into at least three groups. A plurality of networks are included for being formed by connecting the control units with respect to each of the groups via communications lines. A plurality of gateway units are included for connecting the networks for repeating data so that the control units connected with the networks exchange data. Here, each of the control units includes a high power consumption mode and a low power consumption mode as an operating mode. Each of the control units sends data relating to its operating mode to one of the networks that includes the each of the control units and receives data indicative of being in a high power consumption mode from one of the networks to thereby set its operating mode to the high power consumption mode. When a gateway unit that is included in the gateway units and connected with certain networks of the networks receives first data relating to an operating mode from a first network of the certain networks, the gateway unit connected with the certain networks sends the first data to a network that is included in the certain networks excluding the first network.

Under this structure, unlike a conventional communications system, each gateway unit does not send received data relating to an operating mode to all networks with which the each gateway unit connects, but each gateway unit sends the received data to only a network excluding a network from which the received data is sent. Even when a gateway unit receives data relating to an operating mode from another gateway unit connected to the same network, the gateway unit does not return the received data to the other gateway unit. This prevents occurrence of exchanging the data between the gateway units. Therefore, when each control unit is able to operate in a low power consumption mode, each control unit rapidly transfers to the low power consumption mode.

In another aspect of the present invention, a vehicular communications system in a vehicle is provided with the following. A plurality of control units are included for being grouped into at least three groups. A plurality of networks are included for being formed by connecting the control units with respect to each of the groups via communications lines. A plurality of gateway units are included for connecting the networks for repeating data so that the control units connected with the networks exchange data. Here, each of the control units includes a high power consumption mode and a low power consumption mode as an operating mode. Each of the control units sends data relating to its operating mode to one of the networks that includes the each of the control units and receives data indicative of being in a high power consumption mode from one of the networks to thereby set its operating mode to the high power consumption mode. In a case that a gateway unit that is included in the gateway units and connected with certain networks of the networks receives first data relating to an operating mode from a first network of the certain networks, the following takes place: the gateway unit connected with the certain networks sends the first data to a network that is included in the certain networks excluding the first network; the gateway unit connected with the certain networks sends the first data to the first network when the first data is sent from a control unit included in the first network; and the gateway unit connected with the certain networks does not send the first data to the first network when the first data is sent from an other gateway unit included in the first network.

As explained above, the problem in mode management using multiple gateway units results from exchanging data between the gateway units. In contrast, under this structure, a gateway unit sends or repeats data, which is received from a first network, to another network excluding the first network. Further, the gateway unit sends the data to the first network when the data is received from a control unit connected with the first network, while the gateway unit does not send the data to the first network when the data is received from another gateway unit connected with the first network. Thus, the problem due to exchanging the data can be prevented.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
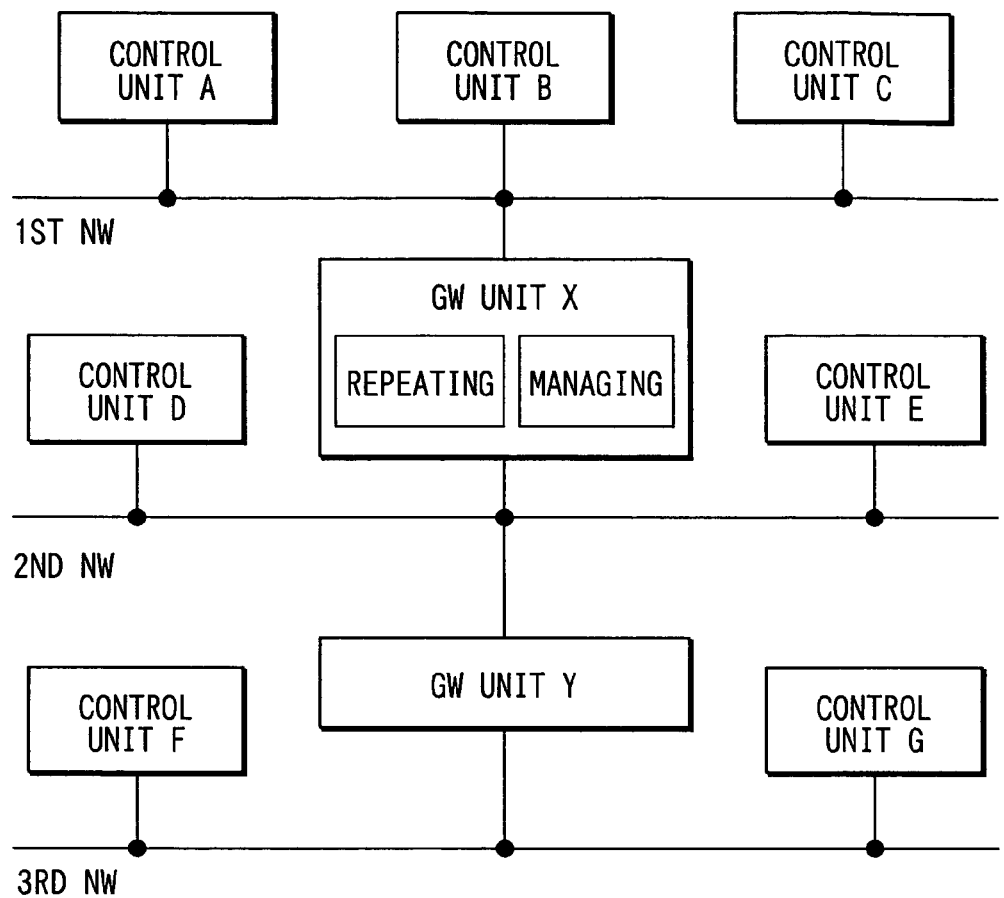
FIG. 1 is a block diagram showing an overall structure of a vehicular communications system according to a first embodiment of the present invention.

A vehicular communications system according to a first embodiment of the present invention is shown in FIG. 1 regarding its overall structure. The system is mounted in a vehicle and includes networks where control units are mutually connected (or networked) via communications lines and gateway units. The control units electronically control in-vehicle devices such as a power-train group, a body group, an information group, and a safety group. The power-train group includes an engine, a transmission, and a brake. The body group includes an air-conditioner, seats, and door-locks. The information group includes a navigation device, an ETC, and a radio. The safety group includes an airbag system.

While an ignition switch is turned on, these control units need to rapidly execute various computation to properly control the in-vehicle devices and therefore are set to a normal operating mode (i.e., high power consumption mode). In contrast, while the ignition switch is turned off and the vehicle is being parked, these control units do not need to exhibit basic vehicular functions and therefore are set to a low power consumption mode. In the low power consumption mode, an operating frequency decreases than that of the normal operating mode; operation stops until a trigger signal is inputted from an external circuit or the like; or operation thoroughly stops. This enables each control unit to decrease its power consumption.

A network structure explained in this embodiment includes the following control units: a control unit changes its operating mode from the low power consumption mode to the high power consumption mode to execute a control process for an in-vehicle device when a given wake-up condition is fulfilled even while the vehicle is being parked; and a control unit needs to change to the normal operating mode in association to changing of another control unit to the normal operating mode.

Such the control unit is e.g., electronic control units (ECU) used for a smart key system, where bilateral communications between a handheld key and a smart key ECU achieves releasing of a door-lock without a mechanical key. In the smart key system, a smart key ECU changes from the low power consumption mode to the normal operating mode every given time intervals as a given condition and then instructs a communicating device to send an inquiry signal and receive a response signal from a handheld key. When the handheld key held by a user receives the inquiry signal, it returns the response signal. Receiving this response signal results in recognition of the user approaching.

The smart key ECU determines whether the holder of the handheld key is a normal user based on the response signal. This determination result is sent to each door ECU to control a door state into a locked state, an unlock standby state, or an unlocked state. For instance, when the handheld key holder is normal and approaching the vehicle, each door ECU sets the corresponding door to the unlock standby state, where the user manipulates a switch in a door handle to enable the door to become unlock. Thus, the smart key ECU and each door ECU need to work cooperatively, so each door ECU changes its operating mode from the low power consumption mode to the normal operating mode in association with a change of the smart key ECU to the normal operating mode.

The vehicle may include an immobilizer ECU to communicate with the smart key ECU when a user conducts a starting operation of an engine, and then switches between start permission or start prohibition based on the communication result. In sum, only when the smart key ECU determines that the user is normal, the immobilizer ECU permits the engine to start. Consequently, it is preferable that the operating mode of the immobilizer ECU changes from the low power consumption mode to the normal operating mode in association with the change of the smart key ECU to the normal operating mode. It can be otherwise designed that a start operation of the engine causes the immobilizer ECU to change to the normal operating mode, and then communications from the immobilizer ECU causes the smart key ECU to change to the normal operating mode.

Thus, there is a control unit that changes its operating mode from the low power consumption mode to the high power consumption mode to execute a control process for an in-vehicle device when a given wake-up condition is fulfilled even while the vehicle is being parked; furthermore, there is a control unit that needs to change to the normal operating mode in association to changing of another control unit to the normal operating mode. In a network structure of this embodiment, such the control units are grouped into at least three groups and the individual groups form multiple networks by connecting the control units via communications lines. Further, the multiple networks are connected by multiple gateway units that repeat data so that the control units can exchange data.

A reason for forming at least three networks is as follows: restricting the number of control units connected to each network decreases waiting time of data transmission; or decreasing a wiring length reduces a tendency of waveforms' deviations of transmission signals due to extended wiring length of the network.

As shown in FIG. 1, a first network connects control units A, B, C; a second network connects control units D, E; and a third network connects control units F, G. Located between the first network and the second network is a gateway unit X; and located between the second network and the third network is a gateway unit Y. In other words, the gateway unit X connects with (or is included in) both the first network and the second network, while the gateway unit Y connects with (or is included in) both the second network and the third network. Further, the second network includes both the gateway units X, Y. Furthermore, a gateway unit or a control unit is referred to below as a unit being a generic name.

Under explanation below, the above network structure adopts a known token passing method as a communications protocol. However, the communications protocol can be a CSMA/CR (Carrier Sense Multiple Access with Collision Resolution) method or a TDMA (Time Division Multiple Access). Furthermore, when a gateway unit includes a protocol conversion function, each network can adopt an individually different protocol.

Figure 2A:
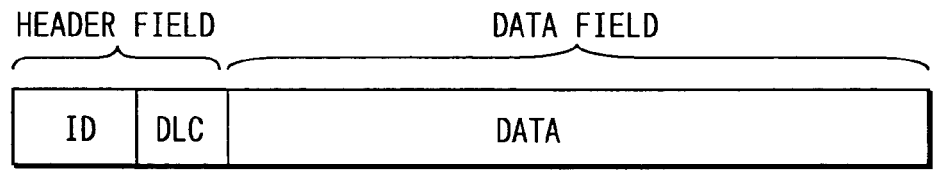
FIG. 2A is a diagram illustratively showing a structure for a communications data frame.

FIG. 2A shows a communications data frame structure used for exchanging data between the control units for cooperative control or distributed control. The communications data frame includes a header field and a data field. The data field includes data. The header field includes an ID and a data length code (DLC). The ID is a code unique to each unit, i.e., the ID is used for only one unit. The DLC indicates a length of the data.

Figure 2B:
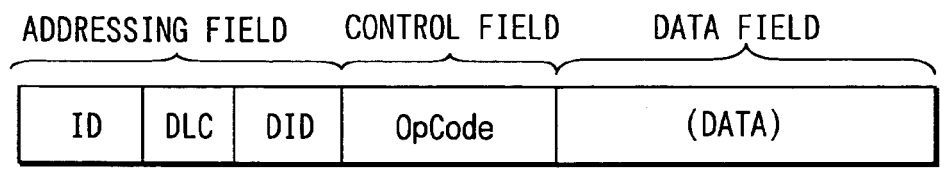
FIG. 2B is a diagram illustratively showing a structure for a mode managing data frame.

FIG. 2B shows a mode managing data frame structure used for managing an operating mode of each control unit. The mode managing data frame includes an addressing field, a control field, and a data field. Here, the mode managing data frame is not sent by using the data field. Here, the data filed is included just for corresponding to the length of the communications data frame shown in FIG. 2A.

The addressing field includes an ID indicating a unit of a data sender, a data length (DLC) of the mode managing data, and a destination ID (DID) indicating a unit that is given a token of a sending right. The communications data and the mode managing data can be individually recognized by differentiating their IDs from each other. The control field includes an operation code (OpCode). This operation code includes an indicator code Ind and an acknowledge code Ack.

The indicator code Ind indicates whether a control unit of a sender for the mode managing data is able to transfer to the low power consumption mode without needing to execute a given control process. For instance. Ind=1 is outputted when being able to transfer (or change) to the low power consumption mode, and Ind=0 is outputted when being unable to transfer to the low power consumption mode. The acknowledge code Ack indicates permission or prohibition of transferring to the low power consumption mode to all control units within a network. For instance, Ack=1 is outputted for permission, and Ack=0 is outputted for prohibition.

Each control unit sends the communications data and the mode managing data to control units and a gateway unit within a network at a timing when obtaining a sending right (token). When a control unit within the network receives the communications data, the control unit determines whether the communications data is necessary for own control from an ID indicating a sender of the data. The control unit then stores only necessary data. Further, based on the mode managing data, the control unit stores an operating mode of the relevant control unit and determines whether the control unit itself obtains the sending right. When a gateway unit within the network receives the communications data and the mode managing data, the gateway unit repeats those data for sending the communications data and the mode managing data to a network needing those data by a data repeating unit and a mode managing unit (shown within GW UNIT X in FIG. 1).

Figure 3:
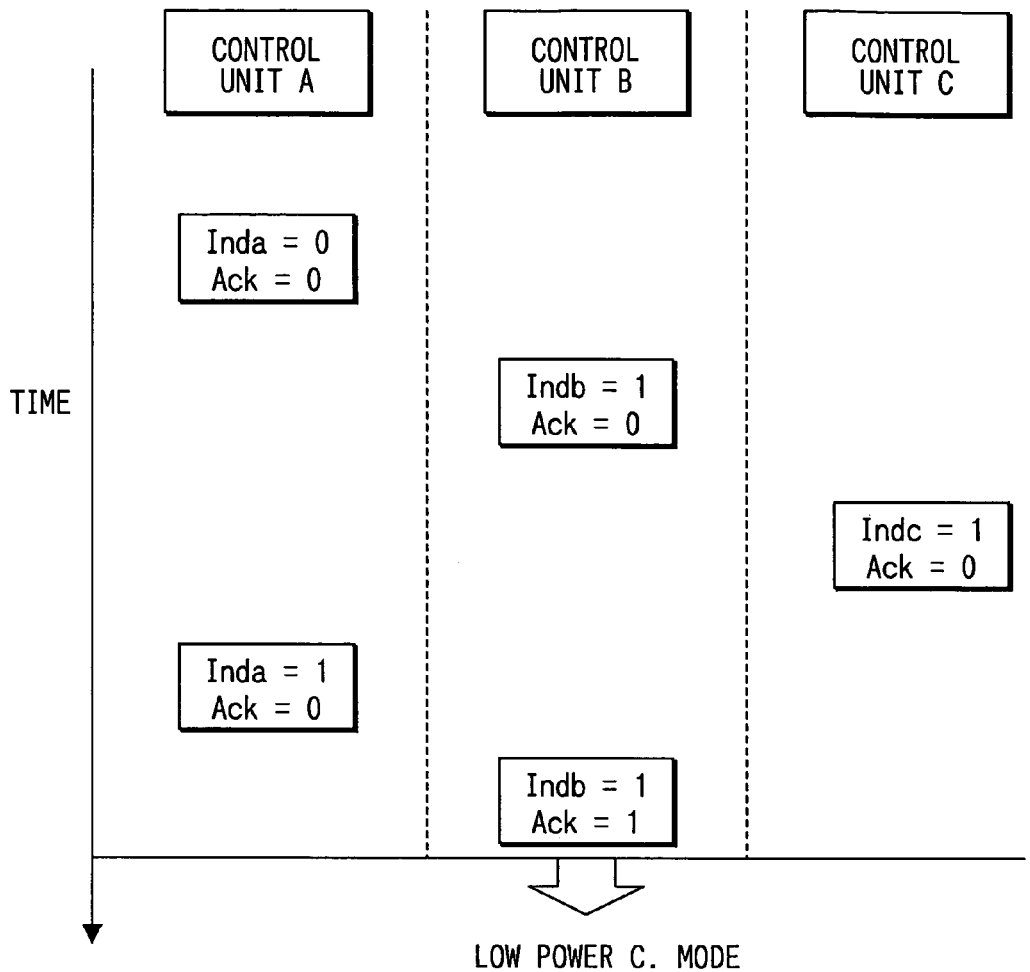
FIG. 3 is a diagram explaining variations of operation codes.

Transitions of operating modes with respect to each control unit within one network using mode managing data will be explained with reference to FIG. 3 using the control units A to C connected to the first network as examples. FIG. 3 shows variations of the operation codes exchanged by each control unit within the first network when the control unit A transfers from the normal operating mode to the low power consumption mode.

When the operation mode of the control unit A is the normal operating mode, an indicator code Inda in the operation code is 0. Therefore, there is a need for prohibiting other control units from transferring to the low power consumption mode, so the acknowledge code Ack is 0. In contrast, the control units B, C are able to transferring to the low power consumption mode, so indicator codes Indb=1, Indc=1 are outputted. However, since the control unit A sent indicator code Inda=0, the acknowledge codes Ack is outputted as 0 indicating prohibition of transferring to the low power consumption mode.

Thereafter, when the control unit A completes a given control process and is able to transferring from the normal operating mode to the low power consumption mode, the indicator code Inda=1 is outputted. This causes all indicator codes Inda, Indb, Indc to become 1, so the control unit B output to the all control units A to C the acknowledge code Ack=1 for permitting them to transferring to the low power consumption mode. This causes each control units A to C to transfer from the normal operating mode to the low power consumption mode.

The gateway unit also has the normal operating mode and the low power consumption mode. When all the control units within the same network including the gateway unit transfer to the low power consumption mode, the gateway unit also transfers to the low power consumption mode. When all the control units are in the low power consumption mode, there are no data that requires rapid repeating within the network. Therefore, the gateway unit also transfers to the low power consumption mode, so power consumption can be decreased. Here, the gateway unit can also include a function of a control unit that controls an in-vehicle device. In this case, as long as this gateway unit can be able to transferring to the low power consumption mode as the control unit, this gateway unit can transfer to the low power consumption mode.

Figure 4:
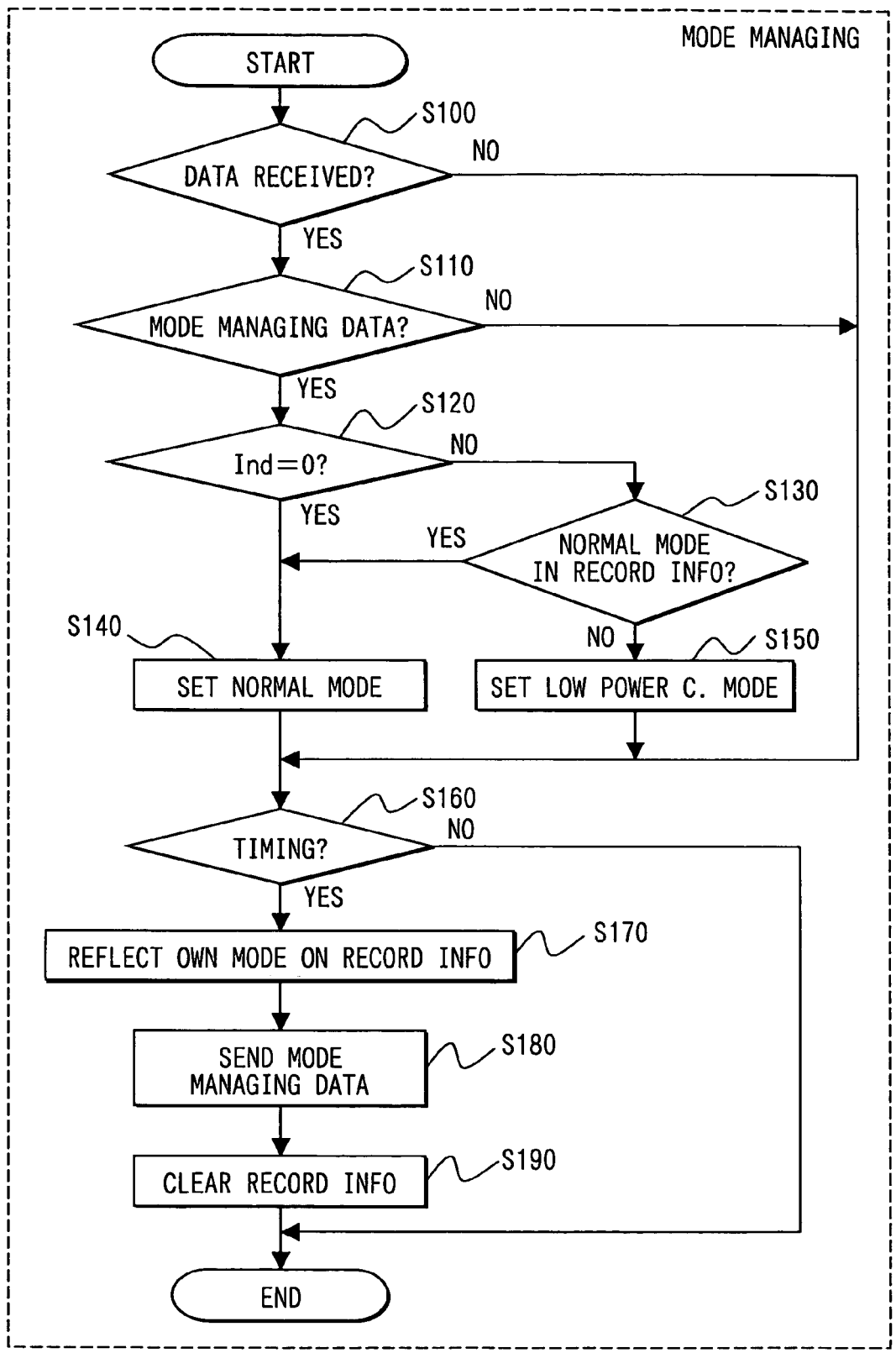
FIG. 4 is a flowchart diagram showing a mode managing process according to the first embodiment.

Next, the mode managing process by a gateway unit will be explained with reference to a flowchart of FIG. 4.

At Step 100, it is determined whether the gateway unit receives data sent from another unit. When this determination at Step S100 is negated, the sequence goes to Step S160. In contrast, when this determination at Step S100 is affirmed, the sequence goes to Step S110.

At Step S110, it is determined whether the received data is mode managing data shown in FIG. 2A based on an ID of the data. When this determination at Step S110 is negated, the sequence goes to Step S160. In contrast, when this determination at Step S100 is affirmed, the sequence goes to Step S120.

At Step S120, it is determined whether a sender of the control unit or the like from which the data is received is operating in the normal operating mode based on the indicator code Ind of the received mode managing data. When this determination at Step S120 is affirmed, the sequence goes to Step S140, where the gateway unit sets the mode managing record information to the normal operating mode. The mode managing record information manages a record of operating modes of each control unit or the like. The mode managing record information is provided in each of the networks with which the gateway unit connects. In sum, the mode managing record information is assigned to each of the multiple networks the gateway unit connects with, and includes a mode corresponding to the operating modes of the control units within each of the networks.

In contrast, when this determination at Step S120 is negated, the sequence goes to Step S130, where it is determined whether there is a control unit or the like that previously sent mode managing data indicating the normal operating mode by referring to the mode managing record information corresponding to the relevant network. In sum, when any control unit or the like previously sent the mode managing data indicating the normal operating mode, the mode managing record information is set to the normal operating mode. Therefore, by referring to the mode managing record information, whether there is a control unit or the like that previously sent mode managing data indicating the normal operating mode is determined.

When the determination at Step S130 is affirmed, the sequence goes to above-described Step S140. The reason is that other control units need to remain in the normal operating mode as long as any control unit remains in the normal operating mode. In contrast, when the determination at Step S130 is negated, the sequence goes to Step S150. Here, the gateway unit sets the mode managing record information to the low power consumption mode since a condition where each control unit is able to transfer to the low power consumption mode is fulfilled.

At Step S160, it is determined whether it is a timing when the gateway unit sends mode managing data based on the mode managing record information. In sum, the gateway unit sends or repeats the communications data or the mode managing data at the timing when a sending right is passed to the gateway unit. Therefore, it is determined whether a sending right for any one of the networks connected with the gateway unit is passed to the gateway unit. When the determination at Step S160 is negated, the process once ends. When the determination at Step S160 is affirmed, the sequence goes to Step S170.

At Step S170, an own operating mode of the gateway unit itself is reflected on the mode managing record information. In detail, even when the mode managing record information is set to the low power consumption mode, the mode managing record information is set to the normal operating mode as long as the gateway unit itself is in the normal operating mode.

At Step S180, the gateway unit sends given mode managing data to a certain network. At current timing, the gateway unit is determined (at Step S160) to have a sending right to the certain network. The given mode managing data is formed based on the mode managing record information corresponding to a network excluding the certain network. As explained above, the gateway unit has mode managing record information indicating operating modes of the control units or the like connected within each network. Based on the mode managing record information, the mode managing data is formed. The mode managing data formed is sent to the network excluding a network corresponding to the mode managing record information.

This process for transmitting the mode managing data at Step S180 will be explained with reference to FIG. 5 that shows the following state. The gateway (GW) unit Y receives mode managing data indicating the normal operating mode from a control unit connected with the third network. The gateway unit Y repeats the received mode managing data to the second network. The gateway unit X receives mode managing data indicating the low power consumption mode from a control unit connected with the first network.

In a conventional method, when a gateway unit receives mode managing data indicating the normal operating mode from a certain network connected with the gateway unit, the gateway unit sends to all networks including the certain network mode managing data for causing all control units to change to the normal operating mode. In the state shown in FIG. 5, assume that the gateway unit X sends mode managing data like a conventional gateway unit. Based on the mode managing data from the gateway unit X, the gateway unit Y consequently sends the mode managing data for causing all control units to change to the normal operating mode to also all connected networks. As a result, the mode managing data for causing all the control units to change to the normal operating mode is repeatedly exchanged between the gateway unit X and the gateway unit Y. Each control unit cannot thereby change to the low power consumption mode.

Figure 5:
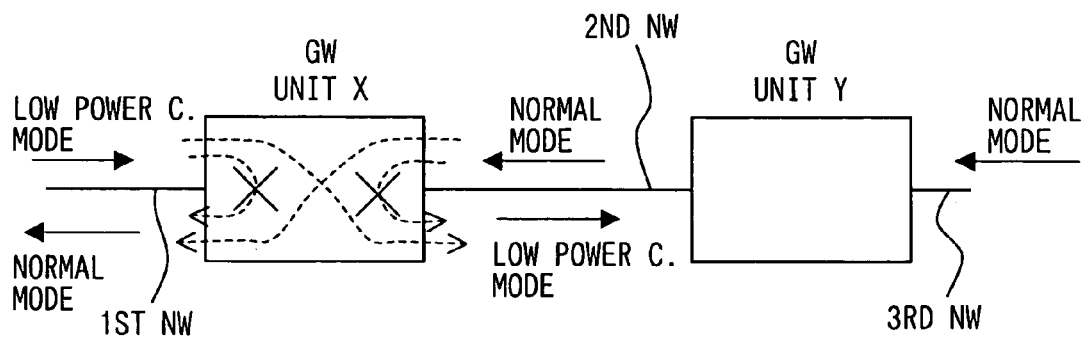
FIG. 5 is a diagram explaining a process for transmitting mode managing data.

In this embodiment, to solve this problem, at Step S180, the mode managing data that is formed based on the mode managing record information corresponding to a certain network is sent only to a network excluding the certain network, as shown in FIG. 5. This avoids the problem of repeatedly exchanging the mode managing data between the gateway units X, Y, which enables each control unit to change to the low power consumption mode.

Here, the gateway unit X, Y sends (or repeats) the communications data or the mode managing data to each network at the timing when a sending right (token) is passed (or given) to the gateway unit X, Y.

At Step S190, to prepare for sending the next mode managing data, the mode managing record information is cleared (to the low power consumption mode) and the process ends.

As explained above, according to this embodiment, even under a network structure where multiple gateways for connecting multiple networks, each control unit rapidly transfers to the low power consumption mode when each control unit becomes able to operate in the low power consumption mode.

Second Embodiment

Next, a second embodiment of the present invention will be explained below. A vehicular communications system according to the second embodiment has the same network structure as that of the first embodiment, so explanation for the network structure is removed here.

In this embodiment, when a gateway unit receives the mode managing data, it is determined whether the sender of the mode managing data is a control unit or a gateway unit. When the sender is a control unit, the mode managing data is sent to all networks including the network connected with the control unit being the sender. When the sender is a gateway unit, the mode managing data of the gateway unit being the sender is not reflected on the mode managing data that is sent to the network connected with the gateway unit being the sender.

This can prevent two gateway units from repeatedly exchanging the mode managing data indicating the normal operating mode.

Figure 6:
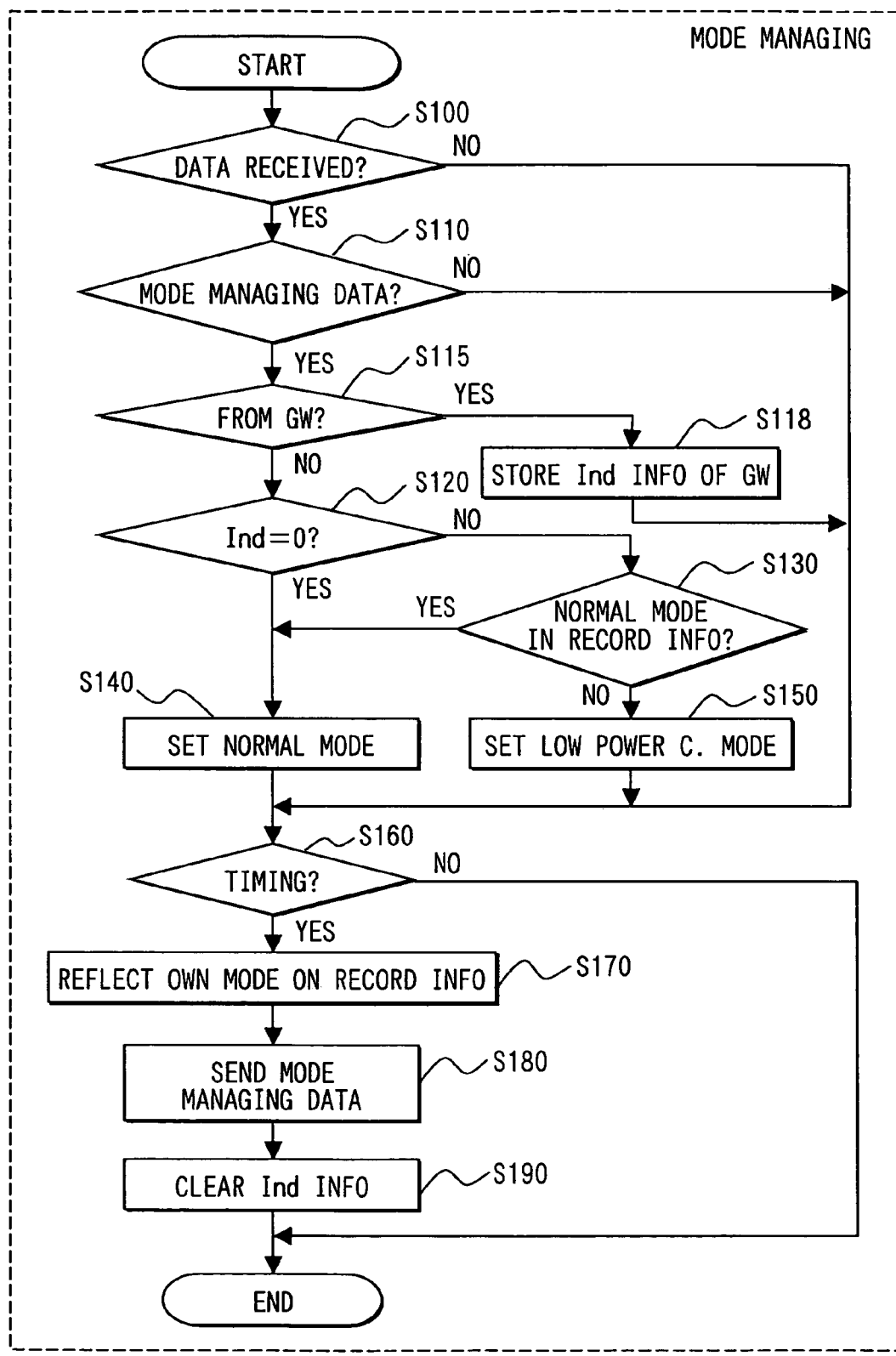
FIG. 6 is a flowchart diagram showing a mode managing process according to a second embodiment of the present invention.

FIG. 6 shows a flowchart of a mode managing process according to the second embodiment, which is almost similar to that of the first embodiment. However, Steps S115, S118 are added while Steps S180, S190 are modified in contrast to the flowchart of the first embodiment.

At Step S115, it is determined whether a sender of the received mode managing data is a given gateway unit based on an ID in the mode managing data. When the determination is affirmed; the sequence goes to Step S118, where the received mode managing data (Ind information) with respect to the given gateway unit is stored.

Thereafter, at Step S180, when the mode managing data is sent to a certain network, the mode managing data is formed by considering the mode managing record information based on the mode managing data received from all the control units connected with the networks and additionally considering the mode managing data received from the gateway units excluding the gateway unit connected with the certain network. In other words, when the mode managing data is sent to a certain network, the mode managing data is formed by excluding the mode managing data received from the gateway unit connected with the certain network.

At Step S190, the mode managing record information that was used for forming the mode managing data sent to the certain network and the mode managing data (Ind information) are cleared and the process shown in FIG. 6 ends.

This prevents the mode managing data indicating the normal operating mode from being repeatedly exchanged between gateway units. Therefore, the resultant problem that control units cannot transfer to the low power consumption mode can be prevented.

Furthermore, in the first embodiment, the gateway unit X connects with two networks of the first network and the second network, while the gateway unit Y connects with two networks of the second network and the third network. However, the gateway unit can connect more than two networks. For instance, the gateway unit Y can further connect with a fourth network in addition to the second network and the third network. In this case, suppose that the gateway unit Y according to the first embodiment receives certain mode managing data from the second network (i.e., the control unit D, E or the gateway unit X). Mode managing data that is formed based on the certain mode managing data is sent only to the third network and the fourth network excluding the second network by the gateway unit Y.

Furthermore, in the second embodiment, similarly, the gateway unit can connect more than two networks. For instance, the gateway unit Y can further connect with a fourth network in addition to the second network and the third network. In this case, suppose that the gateway unit Y according to the second embodiment receives certain mode managing data from the control unit D, E of the second network. Mode managing data that is formed based on the certain mode managing data is sent to the second network, the third network, and the fourth network (naturally including the second network) by the gateway unit Y. In contrast, suppose that the gateway unit Y according to the second embodiment receives certain mode managing data from the gateway unit X of the second network. Mode managing data that is formed based on the certain mode managing data is sent only to the third network and the fourth network (naturally excluding the second network) by the gateway unit Y.

Furthermore, in both the embodiments, a network can include more than two gateway units instead of two gateway units at a maximum.

It will be obvious to those skilled in the art that various changes may be made in the above-described embodiments of the present invention. However, the scope of the present invention should be determined by the following claims.

What is claimed is:

1. A vehicular communications system in a vehicle, the system comprising:
   a plurality of control units that are grouped into at least three groups;
   a plurality of networks formed by connecting the control units with respect to each of the groups via communications lines; and
   a plurality of gateway units that connect the networks for repeating data so that the control units connected with the networks exchange data,
   wherein each of the control units includes a high power consumption mode and a low power consumption mode as an operating mode,
   wherein each of the control units
      sends data relating to its operating mode to one of the networks that includes the each of the control units and
      receives data indicative of being in a high power consumption mode from one of the networks to thereby set its operating mode to the high power consumption mode, and
   wherein, when a gateway unit that is included in the gateway units and connected with certain networks of the networks receives first data relating to an operating mode from a first network of the certain networks, the gateway unit connected with the certain networks sends the first data to a network that is included in the certain networks excluding the first network.

2. The vehicular communications system of claim 1,
   wherein, while an ignition switch is turned off,
   the operating mode of each of the control units is in the low power consumption mode and the each of the control units works in the high power consumption mode in a case that a given condition is fulfilled.

3. The vehicular communications system of claim 1,
   wherein each of the gateway units also includes the high power consumption mode and the low power consumption mode as the operating mode, and wherein an operating mode of a first gateway unit of the gateway units becomes the low power consumption mode when all control units included in networks where the first gateway unit is connected are in the low power consumption modes.

4. The vehicular communications system of claim 3, wherein, when the first gateway unit includes a function of a control unit that controls a device in the vehicle, an operating mode of the first gateway unit becomes the low power consumption mode in a condition that the operating mode of the first gateway unit is able to change to the low power consumption mode as a control unit.

5. The vehicular communications system of claim 1, wherein the gateway unit connected with the certain networks includes unit determining means for determining whether the first data is sent from a control unit or an other gateway unit, and wherein, when the first data is determined to be sent from a control unit, the gateway unit connected with the certain networks additionally sends the first data to the first network.

6. A vehicular communications system in a vehicle, the system comprising:
- a plurality of control units that are grouped into at least three groups;
- a plurality of networks formed by connecting the control units with respect to each of the groups via communications lines; and
- a plurality of gateway units that connect the networks for repeating data so that the control units connected with the networks exchange data, wherein each of the control units includes a high power consumption mode and a low power consumption mode as an operating mode, wherein each of the control units
sends data relating to its operating mode to one of the networks that includes the each of the control units and
receives data indicative of being in a high power consumption mode from one of the networks to thereby set its operating mode to the high power consumption mode, and wherein, in a case that a gateway unit that is included in the gateway units and connected with certain networks of the networks receives first data relating to an operating mode from a first network of the certain networks, the gateway unit connected with the certain networks sends the first data to a network that is included in the certain networks excluding the first network, the gateway unit connected with the certain networks sends the first data to the first network when the first data is sent from a control unit included in the first network, and the gateway unit connected with the certain networks does not send the first data to the first network when the first data is sent from an other gateway unit included in the first network.

7. The vehicular communications system of claim 6, wherein, while an ignition switch is turned off, the operating mode of each of the control units is in the low power consumption mode and the each of the control units works in the high power consumption mode in a case that a given condition is fulfilled.

8. The vehicular communications system of claim 6, wherein each of the gateway units also includes the high power consumption mode and the low power consumption mode as the operating mode, and wherein an operating mode of a first gateway unit of the gateway units becomes the low power consumption mode when all control units included in networks where the first gateway unit is connected are in the low power consumption modes.

9. The vehicular communications system of claim 8, wherein, when the first gateway unit includes a function of a control unit that controls a device in the vehicle, an operating mode of the first gateway unit becomes the low power consumption mode in a condition that the operating mode of the first gateway unit is able to change to the low power consumption mode as a control unit.

* * * * *